United States Patent
Bosch et al.

(10) Patent No.: US 7,487,506 B1
(45) Date of Patent: Feb. 3, 2009

(54) AUTONOMOUS MANAGEMENT OF SYSTEM THROUGHPUT

(75) Inventors: Georg W. Bosch, Holzgerlingen (DE); Robert Vaupel, Rottenburg (DE); Stefan Wirag, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/015,165

(22) Filed: Jan. 16, 2008

(51) Int. Cl.
*G06F 9/46* (2006.01)
*G06F 15/16* (2006.01)

(52) U.S. Cl. ............... 718/104; 718/105; 709/223; 709/226

(58) Field of Classification Search ......... 718/100–105; 709/223–226
See application file for complete search history.

(56) References Cited

U.S. PATENT DOCUMENTS

| | | | |
|---|---|---|---|
| 5,473,773 A * | 12/1995 | Aman et al. ............... | 718/104 |
| 5,948,065 A * | 9/1999 | Eilert et al. ............... | 709/226 |
| 6,249,800 B1 * | 6/2001 | Aman et al. ............... | 718/105 |
| 6,263,359 B1 | 7/2001 | Fong et al. | |
| 6,282,560 B1 * | 8/2001 | Eilert et al. ............... | 718/100 |
| 6,393,455 B1 | 5/2002 | Eilert et al. | |
| 6,442,583 B1 * | 8/2002 | Eilert et al. ............... | 718/104 |
| 6,654,780 B1 * | 11/2003 | Eilert et al. ............... | 718/104 |
| 6,760,910 B2 | 7/2004 | Eilert et al. | |
| 6,859,926 B1 | 2/2005 | Brenner et al. | |
| 6,990,664 B2 | 1/2006 | Cheeniyil et al. | |
| 7,051,188 B1 | 5/2006 | Kubala et al. | |
| 7,191,446 B2 | 3/2007 | Kosanovic | |

FOREIGN PATENT DOCUMENTS

| | | |
|---|---|---|
| EP | 0725339 A2 | 8/1995 |
| EP | 1256039 B1 | 9/2000 |

OTHER PUBLICATIONS

Bari et al., "System Programmer's Guide to: Workload Manager", IBM Redbook, Nov. 2005, pp. 1-316.*
IBM, "MVS Planning Workload Manager", IBM.com, Sep. 2006, pp. 1-277.*

* cited by examiner

*Primary Examiner*—Lewis A. Bullock, Jr.
*Assistant Examiner*—Jennifer N To
(74) *Attorney, Agent, or Firm*—Cantor Colburn LLP; Joseph Biela

(57) ABSTRACT

A computer program product stored on computer storage media includes instructions for managing a workload in a computing system. The product including instructions for collecting resource and state data for a plurality of service class periods, calculating a long term execution velocity, if sufficient data exists, then determining a goal velocity using the data, otherwise, selecting a default value for the goal velocity, associating the goal velocity with the respective service class period, repeating the calculating, determining, selecting and associating for each service class period in the plurality of service class periods, and adjust the resource access to each of the service class periods according to the associated goal velocities.

4 Claims, 3 Drawing Sheets

AUTONOMOUS MANAGEMENT OF SYSTEM THROUGHPUT

TRADEMARKS

IBM ® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computing systems, and particularly to systems for autonomic management of system throughput.

2. Description of the Related Art

In general, work is classified into service class periods. For throughput oriented work, mapping of a customer defined velocity objective to a goal velocity is used to manage resource access in service class periods. Dynamic calculation of a goal velocity may be performed and based on a velocity objective dependent on changing workload requirements. Automatic adjusting of the resource requirements for the work towards a customer defined velocity objective may also be performed. In order to provide some perspective, a discussion of aspects of workload management and transaction management is now provided.

In a computing environment, an operating system of a computer provides workload management for processing units of work (processes, threads, etc.). Generally, the units of work are organized into classes (referred to as service classes) and are provided system resources in accordance with how well they are meeting predefined goals. For example, resources are reassigned from a donor service class to a receiver service class if the improvement in performance of the receiver class resulting from such reassignment exceeds the degradation in performance of the donor class. In short, reassignment takes place if there is a net positive effect in performance as determined by performance criteria. Workload management of this type differs from resource management performed by most operating systems. The assignment of a resource is determined not only by its effect on the work units to which the resources are reassigned, but also by its effect on the work units from which they are taken.

In this context, transaction management is a part of workload management. Transaction management provides a capability for an environment to recognize transaction or business units of work which span multiple processes and thus are processed by multiple execution instances of the operating system.

What are needed are techniques to autonomically manage work towards a system throughput oriented goal without requiring the customer to understand the internal behavior of the work. Preferably, the techniques allow the customer to define a system throughput oriented goal in an abstract manner. What are needed are solutions such as those provided herein.

SUMMARY OF THE INVENTION

The shortcomings of the prior art are overcome and additional advantages are provided through the provision of a computer program product including computer executable instructions stored on computer readable media, the instructions for managing a workload including work units in a computing system, the product including instructions for: collecting resource and state data for a plurality of service class periods; calculating a long term execution velocity; if sufficient data exists, then determining a goal velocity using the data, otherwise, selecting a default value for the goal velocity; associating the goal velocity with the respective service class period; repeating the calculating, determining, selecting and associating for each service class period in the plurality; and adjusting resource access to each of the service class periods according to the associated goal velocities; wherein determining the goal velocity includes solving a relationship including:

$$\text{GoalVelocity} = \text{MIN}(\text{MaxPosVelocity}; \text{Adjusted}(\text{TargetPI} * \text{LTVelocity})).$$

TECHNICAL EFFECTS

As a result of the summarized invention, technically we have achieved a solution which a method to autonomically manage work towards a system throughput oriented goal without having the customer to understand the internal behavior of the work is provided. The method will autonomically adjust to changing workload and hardware requirements and therefore allow the customer to define a system throughput oriented goal in an abstract manner.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

Figure 1:
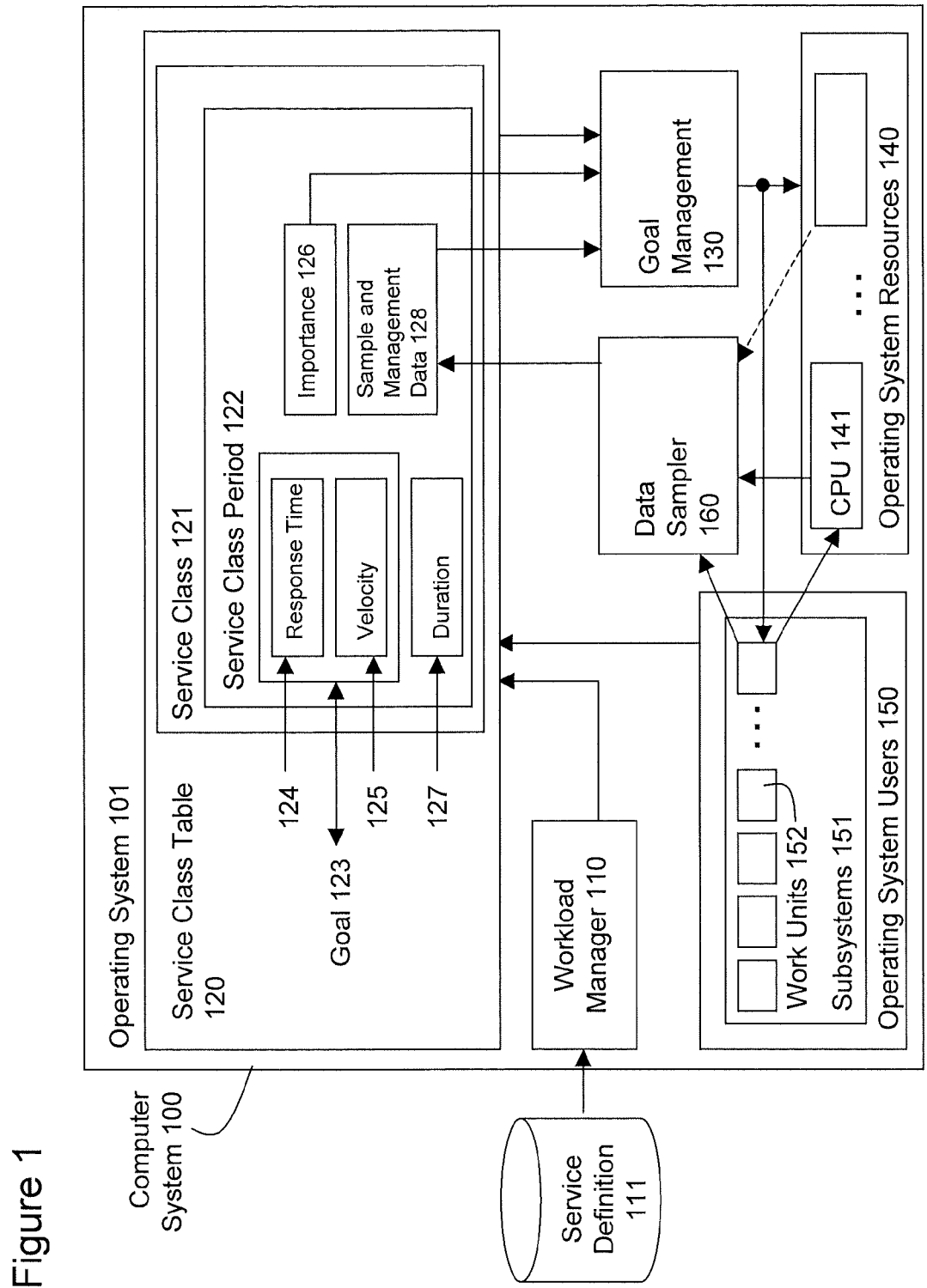
FIG. 1 illustrates one example of a computing system implementing the teachings herein.

The detailed description explains the preferred embodiments of the invention, together with advantages and features, by way of example with reference to the drawings.

DETAILED DESCRIPTION OF THE INVENTION

The teachings herein provide for autonomous management of the throughput of a computing system. In an exemplary embodiment, the management calls for learning system throughput and internal behavior of work in terms of using and delay counts.

Aspects of workload management and the management of business units of work are disclosed in the following commonly owned patents, pending patent applications, and non-patent publications, incorporated herein by reference: U.S. Pat. No. 5,504,894 to D. F. Ferguson et al., entitled "Workload Manager for Achieving Transaction Class Response Time Goals in a Multiprocessing System"; U.S. Pat. No. 5,473,773 to J. D. Aman et al., entitled "Apparatus and Method for Managing a data Processing System Workload According to Two or More Distinct Processing Goals"; U.S. Pat. No. 5,537,542 to C. K. Eilert et al., entitled "Apparatus and Method for Managing a Server Workload According to Client Performance Goals in a Client/Server Data Processing System"; U.S. Pat. No. 5,974,462 to C. K. Eilert et al., entitled "Method and Apparatus for Controlling the Number of Servers in a Client/Server System"; U.S. Pat. Application Ser. No. 08/383,168, filed Feb, 1995, of C. K. Eilert et al., U.S. Pat. No. 5,675,739 entitled "Apparatus and Method for Managing a Distributed Data Processing System Workload According to a Plurality of Distinct Processing Goal Types"; U.S. Pat. Application Ser. No. 08/488,374, filed Jun. 7, 1995, of J. D. Aman et al., entitled "Apparatus and Accompanying Method for Assigning Session Requests in a Multi-Server Sysplex Environment"; MVS Planning: Workload management, IBM publication GC28-1761; and MVS Programming: Workload Management Services, IBM publication GC28-1773.

In prior art systems, such as those described by these references, the management component is able to identify the execution units which process a business unit of work in parallel or in series (e.g., in a sequence). The representation of the business units of work is distinguished from the execution units and operating system constructs. For convenience, such business units are often referred to as each being an "enclave." Business units of work (i.e., enclaves) with the same or similar characteristics are associated within a single service class. This is performed by the operating system based on attributes which are provided by the subsystems, middleware, or applications which process the business units of work and which are made useable to a customer. The customer uses the attributes to define the classification characteristics of the business units of work which associate them with the service classes. The service classes are associated with goals and an importance level which tell the system how it has to deal with the work in the service class. After the work is landed there, it consumes resources. If resource consumption varies, it can result in degradation for other work in the system, especially if very long running business units of work use too many resources. The customer has the possibility to further define service periods to reduce the goals for long running and high resource consuming work.

Workload management enables an installation to manage its workloads against user defined goals or against user defined resource entitlements. In any case, it is required by the installation to classify the work into distinct service or resource classes and to define attributes how the work is being managed.

One of the difficulties with this approach is the definition of resource entitlements or system throughput oriented goals. While the definition of response time oriented goals seems straightforward for a customer, a system throughput oriented goal requires understanding how the work behaves internally and thus looses its external objective for the customer. In general, a customer is not able to define a system throughput oriented goal without having an thorough understanding of behavior internal to the system.

The disclosure herein provides a method to autonomically manage work towards a system throughput oriented goal without having the customer to understand the internal behavior of the work. Furthermore, the method will autonomically adjust to changing workload and hardware requirements and therefore allow the customer to define a system throughput oriented goal in an abstract manner.

FIG. 1 illustrates aspects of the computing environment and certain features of the present invention. In this example, a computer system 100 is provided for executing a workload and is controlled by an operating system 101 (such as the IBM z/OS operating system, available from International Business Machines of Armonk N.Y.). The operating system 101 executes various instructions, such as those generally described in this specification. The system 100 may include a system such as the one disclosed in U.S. Pat. No. 5,675,739, while further enhancements may be included, examples of which are described herein. Although not shown in FIG. 1, system 100 may be one of a plurality of interconnected systems that are similarly managed and make up an infrastructure referred to as a "sysplex." Some embodiments of general server management are described in U.S. Pat. No. 5,974,462, with certain enhancements and other embodiments described in this specification. In order to provide some perspective, aspects of architecture for workload management are now discussed.

The workload manager 110 is a component of the operating system 101. In an exemplary embodiment, the workload manager 110 functions based on definitions included in a service definition 111 which is defined by the customer and read during system activation. The definitions include the service classes 121 and service goals 123. The service classes 121 are organized in a service class table 120 which is an internal representation of the data basis for the decisions made by the workload management system. The service class 121 is further divided into service periods 122. The service periods 122 are associated with the goals 123 which can either be a response time 124 based goal or a throughput oriented goal which is referred to as an "execution velocity 125 goal." Each service period 122 is further associated with an importance level 126 which tells the workload management component which service periods 122 need preferred treatment if the system resources are low. In order to assure that work can only consume a certain amount of resources, each service period 122 may be associated with a duration 127. If a service class 121 includes only one service period 122, the duration definition may be omitted (thus infinite). The same applies for the last service period 122 of the service class 121. The duration 127 is defined in consumable resource units, and depends on the operating system 101. For the z/OS operating system 101, the duration definition is named a service unit which allows normalizing the processor, storage and I/O consumption to consumable resource units. The service period 122 furthermore includes sample and management data which are used during runtime to determine the goal achievement and switch of business units of work from period to period.

Business units of work 152 are recognized by the operating system users 150. These are subsystems 151 which use a set of predefined interfaces to the workload management component to associate a new business unit of work with a service class 121. The workload management component consistently collects data about the operating system resources 140, such as CPU resources 141, memory etc. The workload management component is complemented by a data sampler 160 which collects the data and thus generates the sample and management data of the service periods 128. The workload manager 110 uses the collected sample and management data 128 to reach decisions and influences the access of the work to the resources (i.e. controls the access of work units 152 to the operating system resources 140). These stages of deciding about the access of work units 152 are carried out in a goal management device 130, which complements the workload manager 110.

The teachings herein focus on the execution velocity goal 125. The execution velocity goal 125 is required for service class periods 122 that are not associated with a defined response time goal 124. That is, a response time goal 124 can only be defined for workloads which tell the workload management component when a new business unit of work 152 starts and when it ends. For all other workloads, an execution velocity goal 125 is required. For convenience, the execution velocity is defined as the proportion of all measured "using samples" to all productive samples which are recognized by the workload management component. This includes all samples when the work waits on resources which the workload management component is able to manage. This is also described by Eq. (1):

$$\text{Execution Velocity} = \frac{\text{Using Samples}}{\text{Using Samples} + \text{Delay Samples}} \cdot 100 \quad (1)$$

The result is a value between 0 and 100, 0 meaning that the work is completely blocked and not able to run and 100 that the work can execute in the system 100 without any delays. Thus, the execution velocity goal 125 defines a relative throughput measure for work in the system 100.

A measure of goal achievement for work being managed towards an execution velocity goal 125 is referred to as performance index (PI). The performance index (PI) is defined as a proportion of the execution velocity goal 125 (also referred to as "goal velocity") to achieved or measured execution velocity (also referred to as "achieved velocity"). The performance index (PI) is described by Eq. (2):

$$\text{Performance Index} = \frac{\text{Goal Velocity}}{\text{Achieved Velocity}} \quad (2)$$

As long as the PI value is smaller than 1, the achieved velocity exceeds the goal velocity and the goal fulfillment exceeds the expectation. The goal expectation is exactly met at a value of 1 and missed when the achieved velocity is smaller than the installation defined goal velocity 125. In the latter case, the workload management algorithms may be referred to improve reassigning resources to help the service class period which misses its goal.

The difficulty with defining a goal velocity 125 for a computer system 100 is that it depends on many factors and that it varies over time. For example, the using and delay samples for a service class 121 can dramatically change based on: utilization of the physical and logical computer system 100; the service consumption of the workload itself; the number tasks of the workload executing in parallel; other work which runs with the same priority or importance in the system 100; the number of processors 141 which are available for the computer system 100.

All these factors are not fixed and can change over time. In order to find a meaningful goal value, the installation must measure the system at high contention periods and must adjust the derived values periodically.

Accordingly, techniques for dynamically adjusting workload management criteria are provided. In one embodiment, establishing a meaningful goal value is completed by letting the system 100 define a relative velocity objective. This objective expresses the expectation regarding how stringently the workload management system should focus on managing the workload. The velocity objective may be one of a fixed number (n) of discrete values. For example, in an embodiment where n =5, values may be provided as: "very fast," "fast," "moderate," "slow,"and "very slow." Internally, these velocity objective values are transformed into a target performance index (also referred to as a "TargetPI") that should be met. Based on the TargetPI, a new component of the workload manager periodically recalculates the goal velocity which is used to manage the service class periods in the system. Accordingly, further components for improving workload management are provided and illustrated in FIG. 2.

Figure 2:
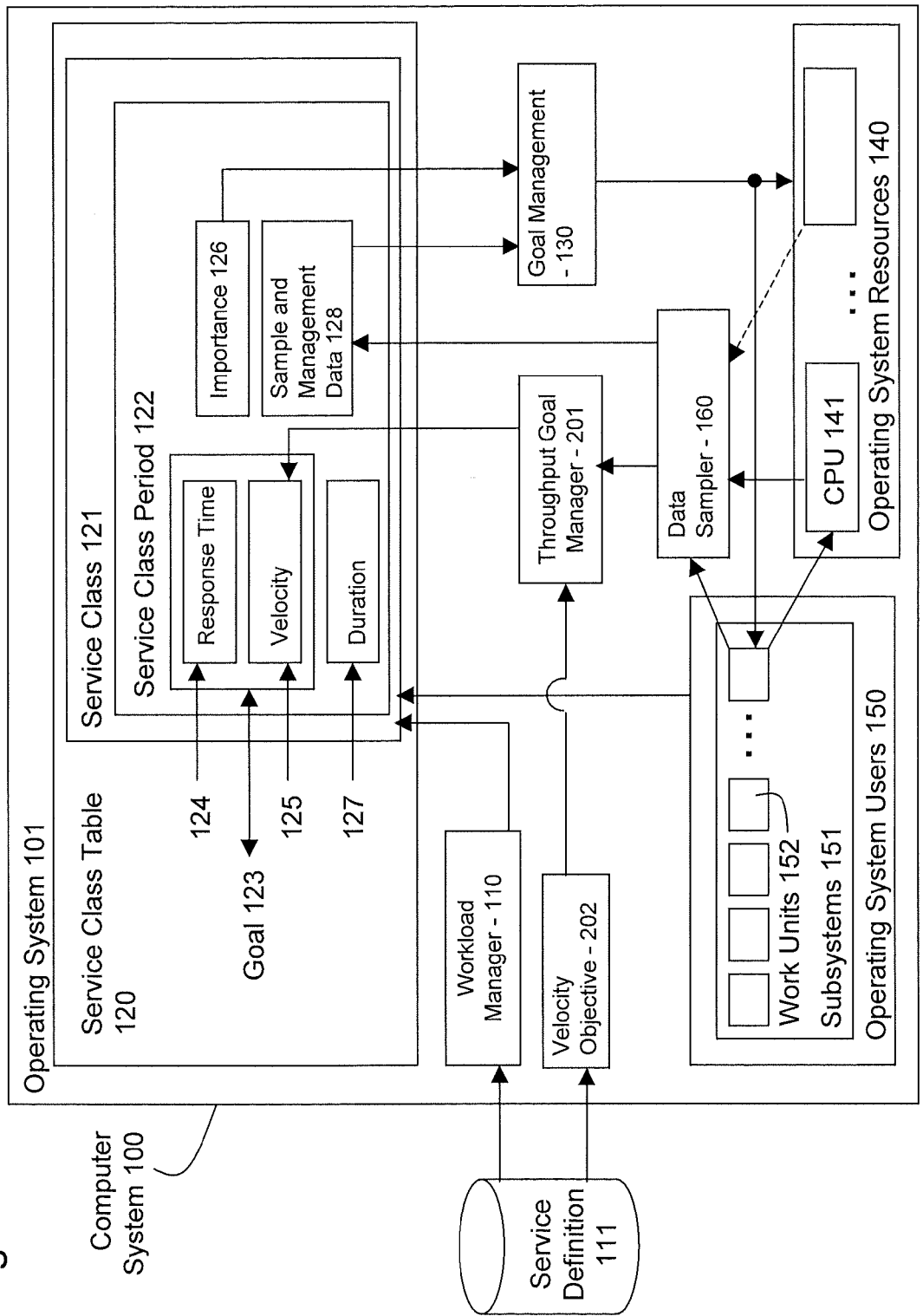
FIG. 2 illustrates another example of a computing system implementing the teachings herein.

In FIG. 2, a velocity objective 202 is provided. The velocity objective 202 is defined by the installation for each throughput-oriented service class period 122. The velocity objectives 202 are saved in the service definition 111. In addition, a throughput goal manager 201 is provided. The throughput goal manager 201 uses data from the data sampler component 160 of the workload manager 110 as well as the velocity objectives 202 to calculate the goal velocity 125 for all service class periods.

Figure 3:
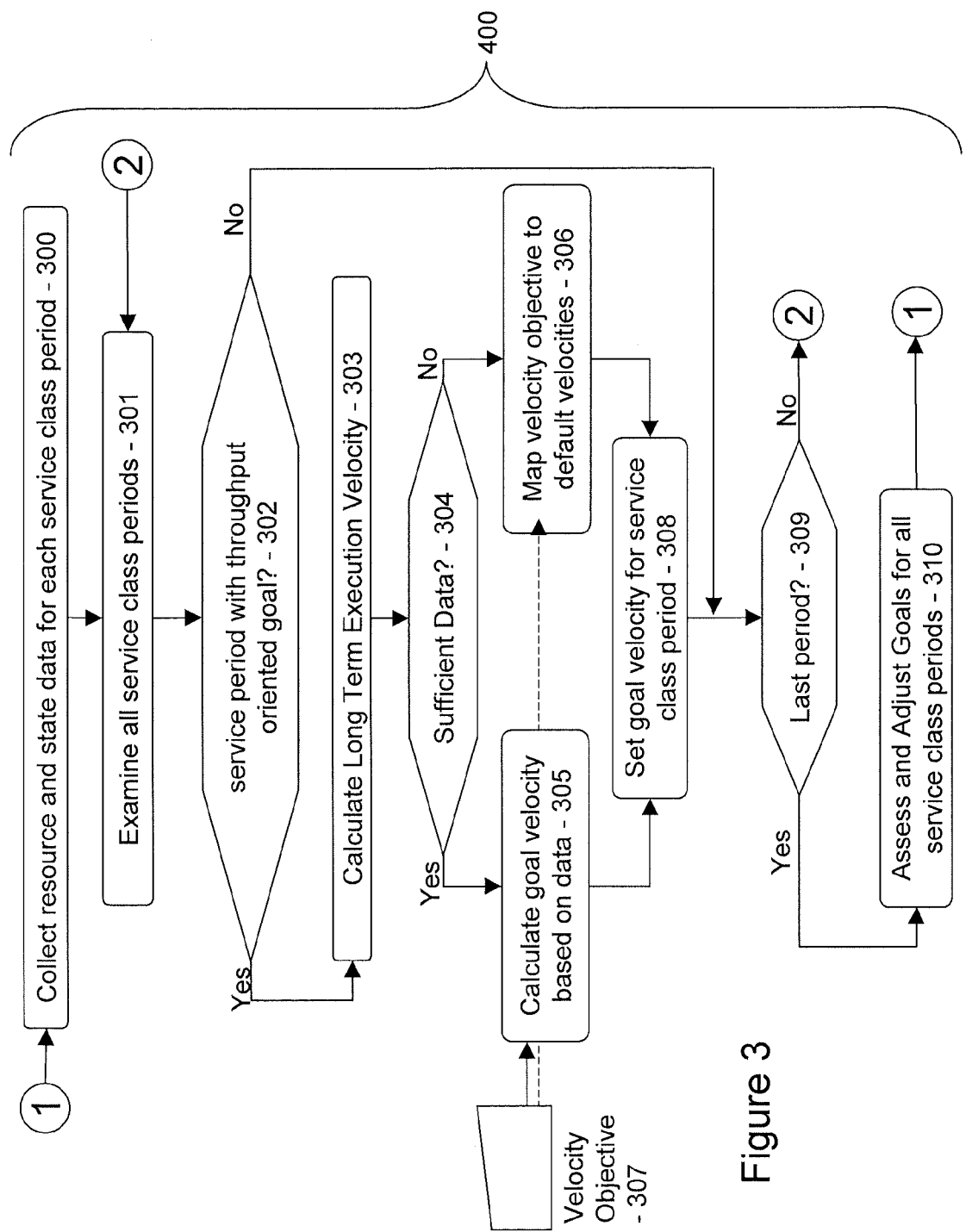
FIG. 3 is a flow chart depicting aspects of a method for implementing the teachings herein.

FIG. 3 describes an exemplary method 400 for the throughput goal manager 201. The workload manager 110 collects resource and state data for each service class period 300. This data is then used to assess and adjust the goals 310 for the service class periods 122. The throughput goal manager 201 introduces a new preprocessing function which reevaluates the goal velocities for all service class periods 122 with a throughput oriented goal.

To accomplish this task, the method 400 examines all service class periods 301 and focuses on those service class periods with a throughput oriented goal 302. If the service class period 122 has a throughput oriented goal (option branch Yes), the method 400 calculates a long term execution velocity 303 (referred to as a "LTVelocity"). If the service class period 122 does not have a throughput oriented goal (option branch No), then the method continues with the next period 309.

Consider a long term execution velocity as an execution velocity for a longer time period for which activity was found for the service class periods 122. It is noted that, an execution velocity goal 125 can show very high fluctuations between immediate measurements (especially in cases with little activity). Smoothing the curve and filtering out periods with little or no activity is desirable for achieving a stable goal velocity. This also requires that the system executes for some time. In this example, the LTVelocity can be calculated by various techniques. For example, the LTVelocity can be calculated by using a geometric filter which adds in the newest calculated value by a factor to the already existing long term value. The actual achieved execution velocity is part of the sample and management data 128 which is collected every decision interval.

Accordingly, if sufficient data 304 do not exist to calculate a long term execution velocity (option branch No), the velocity objective is mapped to default velocities 306. If, for example, the five (5) velocity objective levels were options, an objective level of "very slow" can be mapped to a goal velocity of five (5) and then in steps of ten (10) up to goal velocity value of forty five (45) for "very fast." The earliest that the LTVelocity can be created is after two decision intervals. For stability of the algorithm, it is advisable to wait at least six (6) intervals, otherwise the data source should not be considered as sufficient.

When sufficient data exists (option branch Yes), the goal velocity can be calculated based on existing data 305. First, a mapping from the velocity objective to the TargetPI is defined. The workload manager 110 becomes active to help a service class period when its performance index exceeds a value of 1. Therefore, setting a TargetPI to 1 is conservative as it can be expected that the actual performance index will come out close to this value. This will more often require adjustments than setting a TargetPI to 0.7, for example.

If the five velocity objective levels are used, for example, an objective velocity value of "very slow" can be mapped to a TargetPI of 0.7 and then in steps of 0.1 up to a TargetPI of 1.1 for an objective value of "very fast."

After the velocity objective is mapped to a TargetPI, a formula, such as Eq. (3) may be used to calculate the goal velocity:

$$GoalVelocity = MIN(MaxPosVelocity; Adjusted(TargetPI*LTVelocity)) \quad (3)$$

where:
- MIN is a function that returns a minimum value for an argument list;
- TargetPI represents a customer objective for a performance index;
- LTVelocity represents the long term execution velocity for the service class;
- MaxPosVelocity represents a maximum possible execution velocity for all work at the importance level; and
- Adjusted( ) is a function that rounds the target goal velocity to the next multiple of r.

The result of TargetPI multiplied with LTVelocity is the first approximation for the goal velocity. The value is adjusted to the nearest multiple of r, because a distinction of each individual value is not possible from a practical perspective. Accordingly, a value of r=5 provides usually a good distinction. In addition, the maximum possible velocity (MaxPosVelocity) for all work at the same importance level is measured and it is assured that the calculated value will not exceed this value. The MaxPosVelocity can be calculated from the sample data and is part of the sample and management data 128.

After determination of the goal velocity, the value is propagated to the respective service class period 308 and the method 400 continues with the next period (option branch No) as long as some of the service class periods 122 have been evaluated (option branch Yes). Finally, the method 400 exits to the existing workload management function of the operating system 310 that is using the calculated goal velocities to adjust the resource access of the service class periods 122.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams, the various stages, operations or steps described therein without departing from the spirit of the invention. For instance, the operations may be performed in a differing order, may be added to, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product comprising computer executable instructions stored on computer storage media, the instructions for managing a workload comprising work units in a computing system, the product comprising instructions for:
   - collecting resource and state data for a plurality of service class periods;
   - calculating a long term execution velocity;
   - if sufficient data exists, then determining a goal velocity using the data, otherwise, selecting a default value for the goal velocity;
   - associating the goal velocity with the respective service class period;
   - repeating the calculating, determining, selecting and associating for each service class period in the plurality service class periods; and
   - adjusting resource access to each of the service class periods according to the associated goal velocities;
   - wherein determining the goal velocity comprises solving a relationship comprising:

GoalVelocity= MIN(MaxPosVelocity; Adjusted(TargetPI*LTVelocity))

where:
   - MIN is a function that returns a minimum value for an argument list wherein the performance index comprises an index that is at least one of: very fast, fast, moderate, slow and very slow;
   - TargetPI represents a performance index;
   - LTVelocity represents the long term execution velocity for the service class;
   - MaxPosVelocity represents a maximum possible execution velocity for all work at the importance level; and
   - Adjusted( ) is a function that rounds the target goal velocity.

2. The computer program product as in claim 1, further comprising instructions for receiving an externally set velocity objective for the long term execution velocity.

3. The computer program product as in claim 1, further comprising instructions for determining a performance index.

4. The computer program product as in claim 3, further comprising instructions for determining the goal velocity according to the performance index.

* * * * *